No. 796,410. PATENTED AUG. 8, 1905.
W. E. BOCK.
GLASS TANK.
APPLICATION FILED OCT. 31, 1904.

2 SHEETS—SHEET 1.

No. 796,410. PATENTED AUG. 8, 1905.
W. E. BOCK.
GLASS TANK.
APPLICATION FILED OCT. 31, 1904.

2 SHEETS—SHEET 2.

Witnesses
Geo. H. Graves
H. B. Smith

Inventor
William Emil Bock
By James Whittemore
Atty.

UNITED STATES PATENT OFFICE.

WILLIAM EMIL BOCK, OF TOLEDO, OHIO, ASSIGNOR TO THE TOLEDO GLASS COMPANY, OF TOLEDO, OHIO, A CORPORATION OF OHIO.

GLASS-TANK.

No. 796,410. Specification of Letters Patent. Patented Aug. 8, 1905.

Application filed October 31, 1904. Serial No. 230,816.

*To all whom it may concern:*

Be it known that I, WILLIAM EMIL BOCK, a citizen of the United States, residing at Toledo, in the county of Lucas and State of Ohio, have invented certain new and useful Improvements in Glass-Tanks, of which the following is a specification, reference being had therein to the accompanying drawings.

The invention relates to new and useful improvements in glass-tanks; and it consists in the construction of a tank or holder for molten glass and a movable cover therefor, with means for effecting a relative movement between the tank and cover to expose different portions of the glass in the tank for gathering or dipping operations, as more fully hereinafter described, and particularly pointed out in the claims.

Figure 1:
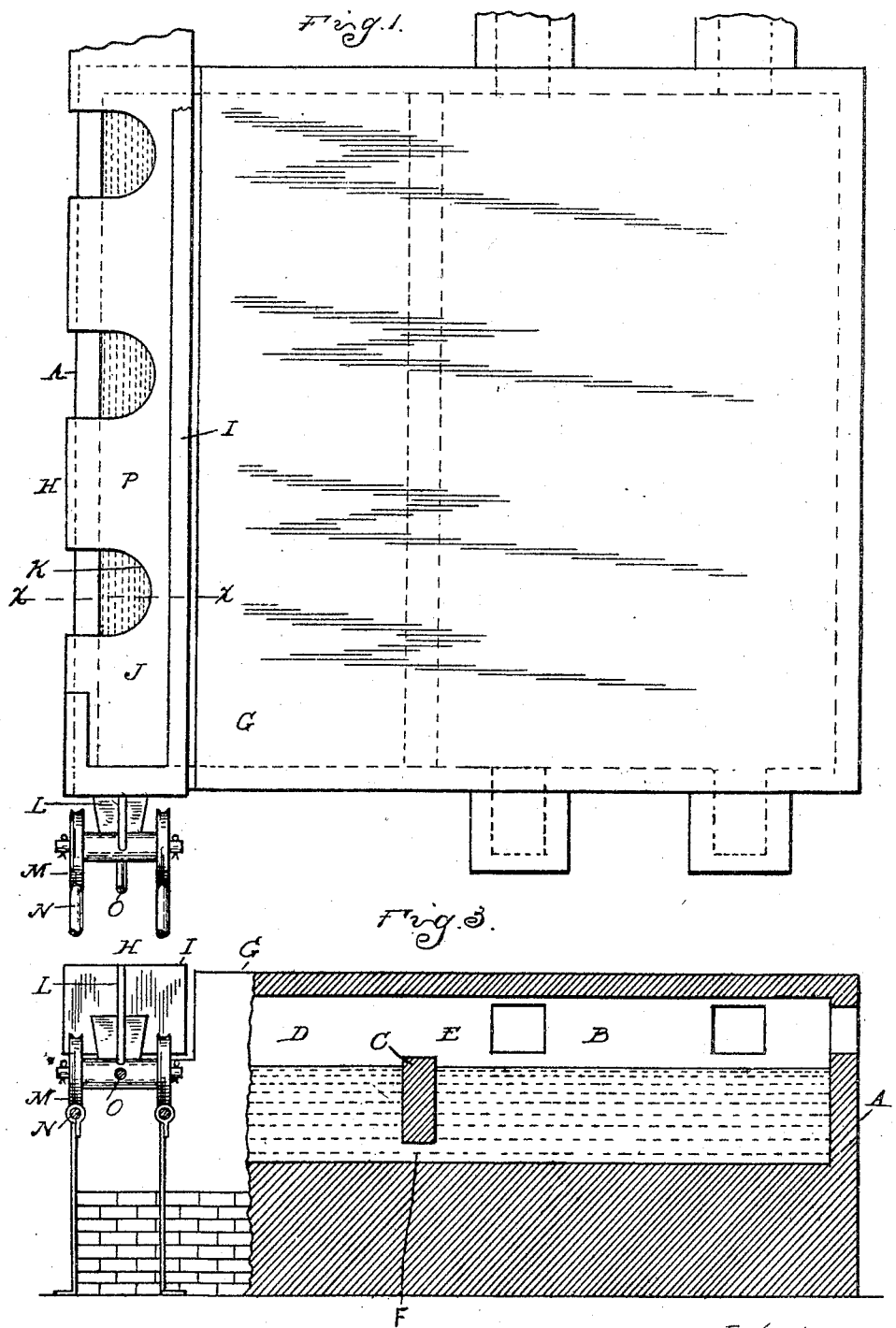
Figure 2:
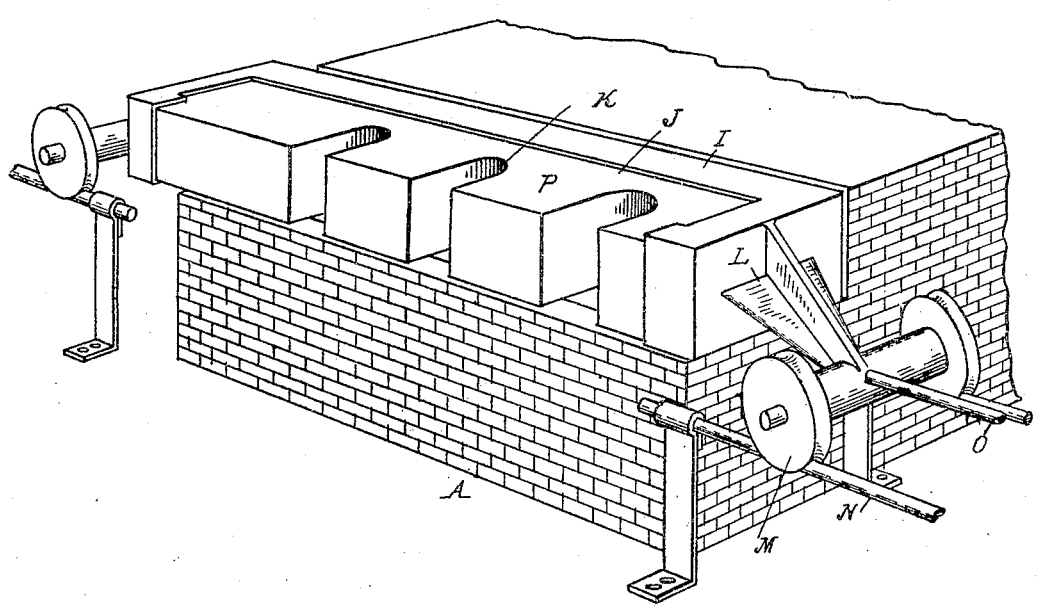
Figure 4:
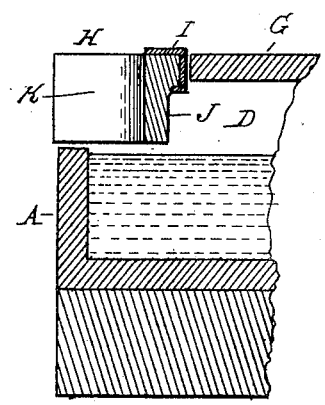

In the drawings, Figure 1 is a top plan view of the tank embodying my invention. Fig. 2 is a front perspective view thereof. Fig. 3 is a side elevation, partly in section; and Fig. 4 is a vertical section on line $x\ x$ of Fig. 1.

A represents the melting-tank, which may be supplied with a heating medium by any ordinary and suitable means. I do not deem it necessary to illustrate the heating means, as such heating means are well known and ordinarily consist of a gas-supply passing through a checker-work on opposite sides of the tank and discharging into the heating-chamber B above the glass-level therein.

C is a partition across the tank, dividing the melting-chamber B from the planing or working chamber D, the two being connected at the bottom through a passage F, and preferably at the top through a passage E, so that there will be heat over the entire mass of glass and so that the melted glass will pass from the chamber B into the chamber D.

The top of the tank comprises the stationary portion G and the movable portion H. The movable portion H, I prefer to construct as shown in Figs. 1 and 2, in which I is a frame—for instance, as of cast-iron—supporting the fire-clay or brick portion J, which portion is provided with a port or ports K. The frame I has the end brackets L, supported on the wheels M, which in turn are supported on the tracks N at opposite sides of the furnace.

The ports K extend over the molten glass within the tank, so as to expose such glass as is beneath the ports for dipping or gathering operations by any suitable means.

The movable part of the top is provided with any suitable actuating means, which will intermittently or periodically reciprocate the same, so that the ports K will expose different or fresh portions of the molten glass in the tank. This movement may be accomplished by any suitable mechanism, such as a crank or a piston, and it is so obvious that I do not deem it necessary to illustrate it. I have shown a connecting-rod O, to which said operating device may be connected.

The parts being thus constructed, their operation is as follows: In gathering the glass, the cover being in the position shown in Fig. 2, the operators dip their blow-irons or punty-rods into the glass exposed by the ports K either successively or simultaneously, as desired, and then the movable cover is reciprocated, so that a portion of the glass previously exposed and in which the dipping took place is covered by the imperforate portions P between the ports, while new or fresh portions of the glass in the tank are exposed for dipping or gathering operations.

While I have shown this specific apparatus, it is obvious that my invention is susceptible of expression in many different forms, and I do not desire to be limited to the precise construction herein shown, as I believe I am first to construct a glass tank or furnace having a top with a port and means for effecting the relative movement between said tank and top to expose different portions of the glass in the tank through a port for gathering.

What I claim as my invention is—

1. The combination of a glass tank or furnace having a top, of means for horizontally moving a portion of said top to present an opening through which the glass may be gathered.

2. The combination of a glass tank or furnace, a top thereover, and means for horizontally moving a portion of said top to periodically expose a portion of the glass in the tank.

3. The combination of a continuous melting-tank, having a planing-chamber, of a top for said chamber, and means for horizontally moving a portion of said top to expose the glass in said chamber for gathering.

4. The combination of a glass tank or holder, of a top therefor, and means for moving a portion of said top to periodically expose different portions of said tank or holder for gathering purpose.

5. The combination of a glass tank, a holder, of a top therefor, having a port adapted to expose a portion of the glass, and means for moving a portion of said top to expose different portions of the glass in the tank through said port.

6. The combination of a glass tank or furnace, having a top, and means for reciprocating a portion of said top to expose different portions of the glass in said tank periodically.

7. The combination of a glass tank or furnace, having a top, ports in said top, and means for effecting a relative movement between said tank and a portion of said top to periodically expose different portions of the glass in the tank through said ports.

8. The combination, in a glass tank or furnace having a top and a port in said top, of means for moving a portion of said top to change the position of said port in relation to the body of glass in the tank.

9. The combination, in a glass tank or furnace having a top and a port in said top, of means for moving a portion of said top to periodically change the position of said port in relation to the body of glass in the tank.

10. The combination of a stationary glass tank or furnace having a movable top and a port in said top, of means for exposing different portions of the glass in said tank through said port.

11. The combination with a continuous melting-tank, having a stationary planing-chamber, of a top for said chamber and means for periodically exposing different portions of the glass in said chamber for gathering.

In testimony whereof I affix my signature in presence of two witnesses.

WILLIAM EMIL BOCK.

Witnesses:
W<small>M</small>. S. W<small>ALBRIDGE</small>,
C. B. H<small>ALSTED</small>.